United States Patent [19]

Ishikura

[11] Patent Number: 5,643,443
[45] Date of Patent: Jul. 1, 1997

[54] WATER PURIFICATION SYSTEM

[75] Inventor: Yukio Ishikura, Tokyo, Japan

[73] Assignee: Taiki Corporation, U.S.A., Portland, Oreg.

[21] Appl. No.: 445,263

[22] Filed: May 19, 1995

[51] Int. Cl.⁶ ........................................... C02F 1/52
[52] U.S. Cl. ............... 210/113; 210/195.1; 210/199; 210/202; 210/208; 210/241
[58] Field of Search ............... 210/113, 195.1, 210/199, 202, 208, 241

[56] References Cited

U.S. PATENT DOCUMENTS

| | | | |
|---|---|---|---|
| 2,422,258 | 6/1947 | Prager | 210/715 |
| 3,258,121 | 6/1966 | Ley | 210/113 |
| 3,577,341 | 5/1971 | Keith et al. | 210/195.1 |
| 3,893,656 | 7/1975 | Opacic et al. | 210/199 |
| 4,160,734 | 7/1979 | Taylor et al. | 210/195.1 |
| 4,287,069 | 9/1981 | Reischl et al. | 210/609 |
| 4,536,286 | 8/1985 | Nugent | 210/208 |
| 4,664,798 | 5/1987 | Bergh | 210/241 |
| 4,807,373 | 2/1989 | Sloan et al. | 210/241 |
| 4,818,392 | 4/1989 | Werner et al. | 210/208 |
| 4,871,449 | 10/1989 | Lott | 210/241 |
| 5,167,840 | 12/1992 | Jaccarino | 210/794 |
| 5,223,150 | 6/1993 | Bundy et al. | 210/765 |
| 5,300,222 | 4/1994 | Broussard, Sr. | 210/202 |
| 5,312,551 | 5/1994 | Perron et al. | 210/195.1 |
| 5,320,750 | 6/1994 | Krofta | 210/264 |

*Primary Examiner*—Peter A. Hruskoci
*Attorney, Agent, or Firm*—Crosby, Heafey, Roach & May

[57] ABSTRACT

A system for purifying dredging water comprises a mixing compartment and an agitating means that mixes water with a coagulating agent. A discharge means collects the coagulated sediment and delivers it to a centrifugal sediment water separating means. An outlet at the top of the fluid container collects the purified water. Recirculation means connects the decanter with the container such that the water extracted from the sludge is returned to the mixing compartment. A conveyor means collects and transports decanted sediment. Preferably, baffles partially separate the container into compartments configured to promote mixing and sedimentation. The conveyor means may comprise a solidification reaction acceleration agent injector to mix this agent with the sediment to further dehydrate and solidify it.

11 Claims, 3 Drawing Sheets

WATER PURIFICATION SYSTEM

BACKGROUND

This invention is directed to a system and method for water purification to remove soil, silt and various light organic materials. In a preferred embodiment, the invention permits water purification in conjunction with dredging of lakes, rivers, ponds, ditches, harbors, ports and the like.

Dredging is often necessary for shipping, conservation efforts, landscaping and other concerns. The sludge typically comprises inorganic materials like silt and soil and light organic materials floating near the bottom of the body of water. Current dredging techniques rely on excavation with dredging machinery like a back hoe. While this method achieves some success with inorganic materials, it largely ignores the organic material. Instead of removing the light organic materials that cause water pollution, the dredging operation tends to diffuse the organic materials into the water. Moreover, even though conventional dredging techniques pollute the water with organic material, varying environmental conditions for dredging prevent current practices from providing low-cost dredging and water purification at the same time.

Current water purification methods rely on sedimentation, filtration or flotation. Sedimentation purifiers are efficient, but typically have slow sedimentation rates making them ill-suited to handle the volume of liquid attendant with dredging operations. Filtration techniques provide the greatest degree of water cleansing, but the filters quickly become loaded requiring complicated contingencies for back washing or bypassing the filter to allow cleaning. None of the conventional techniques are equipped to deal with the volume of liquid produced in a dredging operation. Accordingly, there remains a need for a water purification system useful with a dredging operation which offers an improvement in the present water quality, maintains the water quality after dredging, allows for the simultaneous dredging, purification, fast treatment and reuse of sludge, cost reduction and decrease of the required time.

SUMMARY OF THE INVENTION

The system of the present invention comprises a fluid container with a mixing compartment and an agitating means that mixes water collected during a dredging operation with a coagulating agent. A discharge means collects the coagulated sediment and delivers it to a centrifugal sediment water separating means, a sediment decanter. An outlet means at the top of the fluid container collects the purified water. Recirculation means connects the decanter with the container such that the water extracted from the sludge is returned to the mixing compartment. A conveyor means collects and transports decanted sediment. In a preferred embodiment, the fluid container comprises one or more mixing compartments and one or more sedimentation compartments. Baffles partially separate the compartments and are configured to promote mixing and sedimentation. The discharge means may comprise weight-activated valves at the bottom of the compartments connected to the sediment decanter. Alternatively, the system may comprise a plurality of decanters, each connected by the discharge means to the mixing and sedimentation compartments. Preferably, the conveyor means further comprises a solidification reaction acceleration agent injector to mix this agent with the sediment to further dehydrate and solidify it.

The method of this invention comprises the steps of mixing water collected during dredging with a coagulating agent, permitting the sediment to settle to purify the water, collecting the coagulated sediment, collecting the purified water, decanting the coagulating sediment and returning water extracted during decanting to the mixing. Preferably, the method further comprises the step of mixing the decanted sediment with a solidification reaction acceleration agent to further dehydrate and solidify the sediment.

The system and method allow rapid, efficient purification of water. Preferably, water to be purified may be input at a rate of 150 l/min. More preferably, water is input at a rate of 300 l/min. Substantially greater rates may be sustained depending on the configuration and water quality.

DETAILED DESCRIPTION OF THE DRAWINGS

Figure 1:
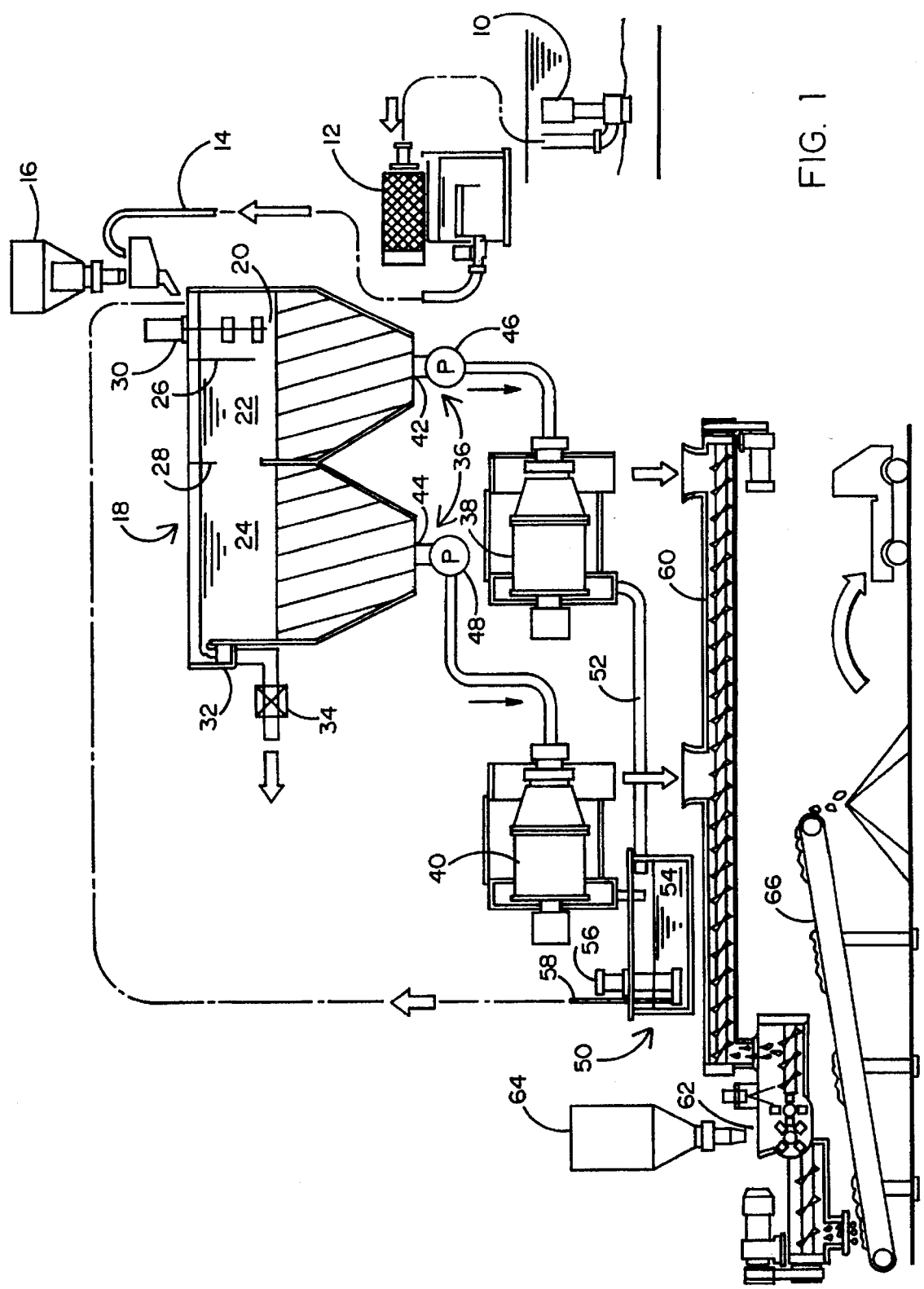
FIG. 1 is a schematic diagram of an embodiment of the system comprising three compartments and two decanters.

Referring to FIG. 1, a dredging pump 10 submerged at the dredging site pumps sludge water through trommel 12 which filters large debris from the sludge water. The resolution of trommel 12 will vary depending on the application, but a filter pore size of about 3 mm is generally suitable. Pipe 14 provides fluid communication between the outlet of trommel 12 and coagulating agent injector 16. The injector 16 meters coagulating agent into the water at a controlled rate, as required by the condition of the water. The water and coagulating agent mixture feeds from injector 16 into water purification container 18. Alternatively, the agent may be added directly to container 18.

Container 18 comprises mixing compartment 20 and sedimentation compartments 22 and 24 defined by baffles 26 and 28. The volume and dimensions of sedimentation compartments 22 and 24 may be conventionally determined based on the desired input rate. Agitating means 30 located in mixing compartment 20 accelerates the reaction of the sludge water with the coagulation agent causing formation of flocculent. Preferably, agitating means 30 comprises counter-rotating blades but other conventional stirring or mixing configurations are suitable. The height and position of baffles 26 and 28 are configured to promote mixing in compartment 20 while providing relatively quiescent conditions in compartments 22 and 24 to facilitate sedimentation of the flocculent. These parameters depend on conditions such as the flocculent's dropping velocity, the depth of the compartments, the cohesive agent contamination rate, the flocculent formation rate and the specific gravities of the components and may be optimized by one of skill in the art. Purified water is collected from container 18 at outlet 32. Preferably, a filter 34 is connected to outlet 32 to further purify the collected water.

Discharge means 36 connects container 18 with centrifugal sediment water separating means, sediment decanters 38 and 40. In this embodiment, discharge means 36 comprises weight-activated valves 42 and 44 at the bottom of container 18 and pumps 46 and 48 to draw sedimented flocculent into decanters 38 and 40. Such decanters are conventional and may be obtained from a number of sources. Although the decanters may be identical, if the configuration of compartments 20, 22 and 24 concentrates large flocculent particles at valve 42, it may be preferable to adapt decanter 38 for larger particles and decanter 40 for finer particles. The separated water is collected by recirculation system 50 which in this embodiment comprises ducts 52 in fluid connection between decanters 38 and 40 and reservoir 54. Pump 56 and return line 58 are configured to deliver water from reservoir 54 to mixing compartment 20. Since water separated from the sediment already has a concentration of coagulating agent, recirculation of the water improves the efficiency of the system.

Screw conveyor 60 is configured to collect sediment discharged from decanters 38 and 40 and deliver it to mixing chamber 62. Typically, the decanters produce sediment that has a water content of about 45 to 50% by weight. Some of this residual water may be dehydrated by further reaction. Solidification reaction accelerating agent injector 64 meters the addition of agent into the sediment as dictated by composition and water content of the sediment. The solidification reaction accelerating agent further dehydrates and solidifies the sediment to facilitate its transportation and reuse. As shown in FIG. 1, an additional conveyor system 66 may transport the reacted sediment to a central site for removal.

Coagulating agents are conventional and may be varied as required by the application. In one embodiment, the coagulating agent using hydration reaction is made of pre-stressed ash (paper sludge). Pre-stressed ash is made from pulp that was produced in the soil, and burned until completely oxidized. In a preferred embodiment, the coagulating agent comprises about 30 to 38% $SiO_2$, 30 to 40% $Al_2O_3$ and 20 to 22% $Fe_2O_3CaOMgO$ with any balance comprising other conventional components. The amount of coagulating agent varies depending on the application, water quality and input rate. In one embodiment, at an input rate of 17000 l/min, useful amounts of coagulating agent range from 360 g/min. (0.0021%) to 1200 g/min. (0.0070%) to 1920 g/min. (0.0110%). Likewise, the solidification reaction accelerating agents are conventional. Preferably, the solidification agent comprises about 50% coal powder and 50% cement. Other conventional trace elements may be added. The amount of solidification agent needed depends on the composition of the sediment recovered from the decanters and depends on the particular water absorption hydration reaction associated with the agent, the desired uniaxial compressive strength of the resulting sediment, the desired pH value and other factors. In general, about 100 to 200 kg of agent are required for each ton of sediment.

Figure 2:
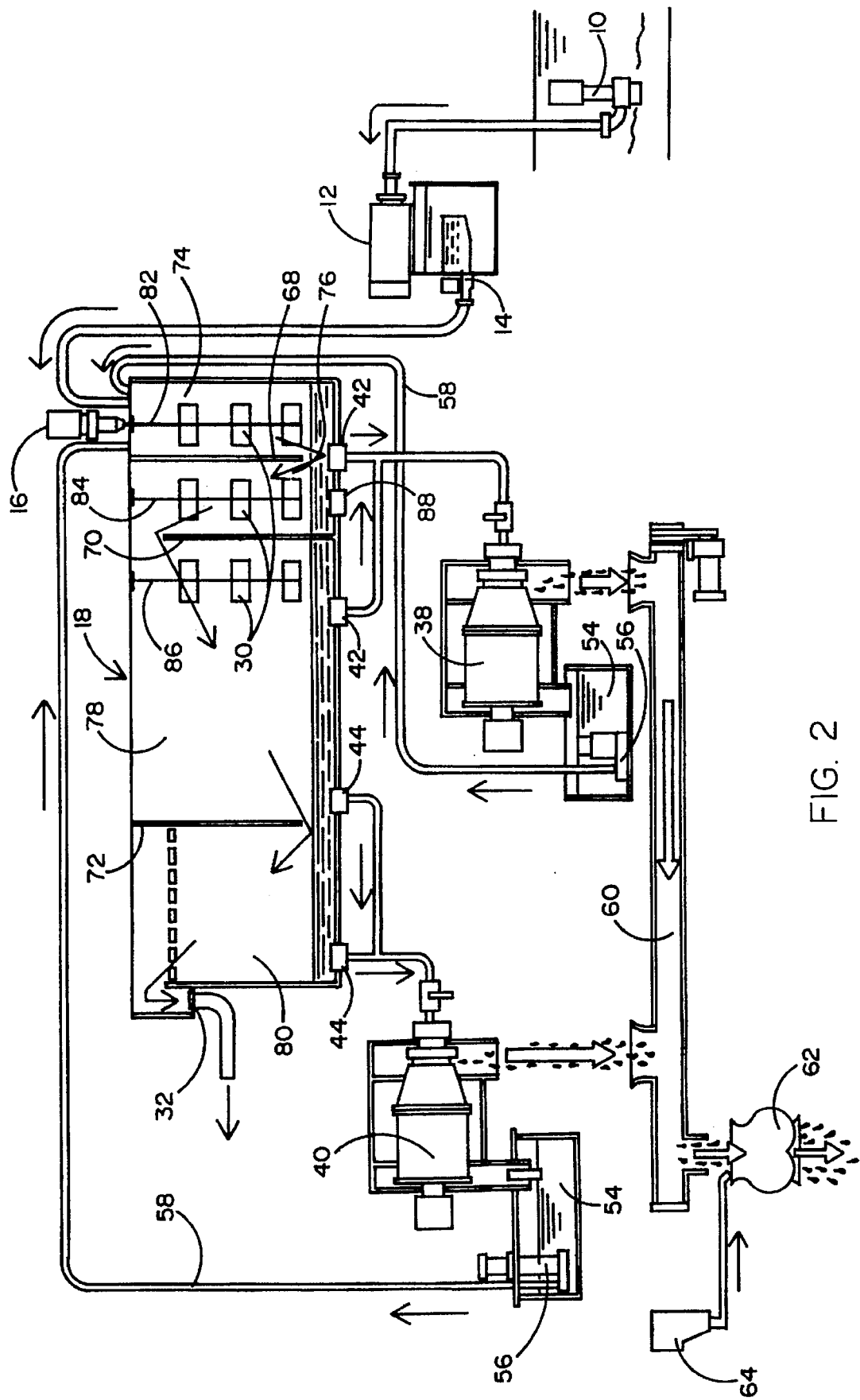
FIG. 2 is a schematic diagram of an embodiment of the system comprising four compartments and two decanters.

FIG. 2 illustrates an alternate embodiment of the invention, featuring a system having a different configuration for water purification container 18. In this system, baffles 68, 70 and 72 separate container 18 into mixing compartments 74 and 76, mixing/sedimentation compartment 78 and sedimentation compartment 80. Baffle 68 permits fluid communication between the bottom of compartments 74 and 76. Baffle 70 permits fluid communication between the top of compartments 76 and 78. Finally, baffle 72 permits fluid communication between the bottom of compartments 78 and 80. The positioning of the baffles promotes formation of flocculent in the mixing compartments and provides facilitates sedimentation. Other baffle configurations are suitable depending on the flow rates and water condition. Agitating means 82, 84 and 86 are disposed in compartments 74, 76 and 78, respectively. In this embodiment, agitating means 82 preferably comprises a counter-rotating blade system capable of turning at relatively high speeds to accelerate the coagulation reactions. Agitating means 84 also preferably comprises counter-rotating blades which should turn at medium speeds to promote formation of large particles of flocculent. Agitating means 86 preferably comprises larger blades, designed to rotate at the slowest speed, such as about 9 rpm, to allow the flocculent to sediment. The system further comprises air injection system 88 to increase the concentration of dissolved oxygen in the water and to otherwise facilitate the purification process. The air injection system 88 releases air into mixing compartment 76, but can release air into the other compartments depending on the desired application.

Figure 3:
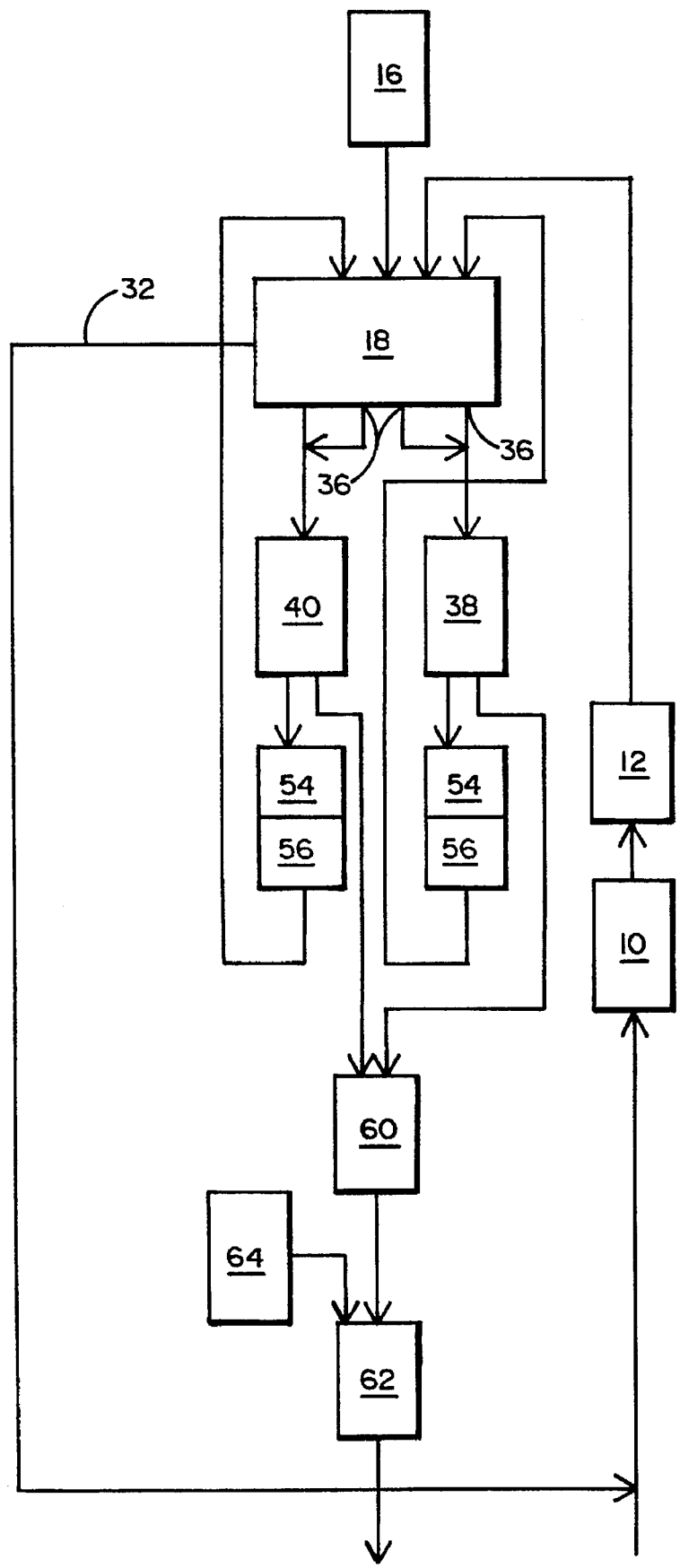
FIG. 3 is a block diagram of steps comprising a method of the invention.

FIG. 3 is a block diagram illustrating steps in the practice of this invention. Dredging pump 10 delivers sludge or muddy water into trommel 12 which removes large debris from the water. Outflow from trommel 12 empties into water purification container 18 where it is mixed with coagulating agent delivered by coagulating agent injector 16 by agitating means 30. Alternatively, the coagulating agent may be added to the water before entering the container 18. The coagulating agent reacts with organic and inorganic material in the water, forming flocculent which sediments to the bottom of container 18. Purified water is collected from the top of container 18. The sediment is collected from the bottom of container 18 by discharge means 36 and delivered to sediment decanters 38 and 40. The decanters separate water from the sediment. The water is recirculated to water purification container 18 and the sediment is delivered by screw conveyor 60 to mixing chamber 62 where solidification reaction accelerating agent injector 64 meters the addition of agent as necessary depending on the sediment condition and desired end use. The treated sediment may be recycled as soil for landscaping, as fill material for road beds and for other applications. When strength is needed, the composition can be adjusted to resemble concrete.

EXAMPLES

Test 1

The system and method of this invention was evaluated for sand extraction at the work site of Tokai Urban Kaihatsu K.K. Shitsuro-eho, Hamamatsu, Shizuoka, Japan for a period of 7.5 hours. Water to be purified was pumped into the system at a rate of 300 l/min. A beaker test demonstrated that 30 g to 50 g of coagulating agent per 1000 liters of dredge water was effective so coagulating agent was added at a rate of 30 g/min. Test conditions were at a 5–9% mud contamination rate. The sediment recovered from the decanters had 45–50% moisture content. A cone index test was used to determine the amount of solidification reaction accelerating agent necessary to produce conveyable discharge. This test demonstrated a 1:5 agent to sediment ratio was effective for sediment having a 50% moisture content sediment, so the input amount of agent was about 30% of sediment weight. Various tests were performed on the water before and after treatment and the results are given below:

| Measuring Item | Measured amount | Method |
| --- | --- | --- |
| Before treatment | | |
| BOD (mg/l) | 19.6 | Japan Industrial Standard K 0102 21 and 32.1 |
| COD (mg/l) | 54.1 | Japan Industrial Standard K 0102 17 |
| SS (mg/l) | 824 | Environment Agency Notification Number 59(1971) Table 6 (G.F.P. Method) |
| pH (°C.) | 8.3(21) | Japan Industrial Standard K 0102 12.1 Glass Electrode Method |
| Zinc (mg/l) less | 0.05 | Japan Industrial Standard K0102 53.2 Frame Atom 0 |
| Copper (mg/l) less | 0.1 | Japan Industrial Standard Standard K 0102 52.2 Frame Atom Absorptiometry |
| Soluble iron (mg/l) less | 0.1 | Japan Industrial Standard K 0102 57.2 Remark 5 Frame Atom Absorptiometry |
| Soluble managanese (mg/l) less | 0.1 | Japan Industrial Standard K 0102 56.2 Remark 3 Frame Atom Absorptiometry |
| Whole Nitrogen (mg/l) | 11.4 | Japan Industrial Standard K 0102 45.1 Method of summation |
| Whole phosphorus (mg/l) less | 0.1 | Japan Industrial Standard K 0102 46.3.2 Nitric acid perchloric acid decomposition Molybdenum blue Absorptiometry |
| Intgerating sphere turbidity | 528 | Japan Industrial Standard K 0101 9.4 (integrating sphere turbidity) |
| Degree of fluoroscopy | 1 | Japan Industrial Standard K 0102 9 |
| After treatment | | |
| BOD (mg/l) | 6.6 | Japan Industrial Standard K 0102 21 and 32.1 |
| COD (mg/l) | 18.4 | Japan Industrial Standard K 0102 17 |
| SS (mg/l) | 41.2 | Environment Agency Notification Number 59(1971) Table 6 (G.F.P. Method) |
| pH (°C.) | 8.1(21) | Japan Industrial Standard K 0102 12.1 Glass Electrode Method |
| Zinc (mg/l) less | 0.05 | Japan Industrial Standard K 0102 53.2 Frame Atom Absorptiometry |
| Copper (mg/l) less | 0.1 | Japan Industrial Standard K 0102 52.2 Frame Atom Absorptiometry |
| Soluble iron (mg/l) less | 0.1 | Japan Industrial Standard K 0102 57.2 Remark 5 Frame Atom Absorptiometry |
| Soluble manganese (mg/l) less | 0.1 | Japan Industrial Standard K 0102 56.2 Remark 3 Frame Atom Absorptiometry |
| Whole Nitrogen (mg/l) | 9.10 | Japan Industrial Standard K 0102 45.1 Method of summation |
| Whole phosphorous (mg/l) less | 0.1 | Japan Industrial Standard K 0102 46.3.2 Nitric acid perchloric acid decomposition Molybdenum blue Absorptiometry |
| Integrating sphere turbidity | 20.8 | Japan Industrial Standard K 0102 9.4 (integrating sphere turbidity) |
| Degree of fluoroscopy | 16 | Japan Industrial Standard K 0102 9 |

Test 2

A similar test was performed at the Shitsuro eel farm, Hamamatsu-shi, Shizuoka Prefecture, Japan with the following results:

| Measured Item | Measured amount | Method |
| --- | --- | --- |
| Before treatment | | |
| BOD (mg/l) | 18.6 | Japan Industrial Standard K 0102 21 and 32.1 |
| COD (mg/l) | 240 | Japan Industrial Standard K 0102 17 |
| SS (mg/l) | 7390 | Environment Agency Notification Number 59(1971) Table 6 (G.F.P. Method) |
| pH (°C.) | 7.7(22) | Japan Industrial Standard K 0102 12.1 Glass Electrode Method |

-continued

| Measured Item | Measured amount | Method |
| --- | --- | --- |
| DO (mg/l) | 2.7 | Japan Industrial Standard K 0102 32.1 Winkler sodium azide blue method |
| Whole Nitrogen (mg/l) | 19.8 | Japan Industrial Standard K 0102 45.1 Method of summation |
| Whole phosphorous (mg/l) less | 3.36 | Japan Industrial Standard K 0102 46.3.2 Nitric acid perchloric acid decomposition Molybdenum blue Absorptiometry |
| After treatment | | |
| BOD (mg/l) | 5.1 | Japan Industrial Standard K 0102 21 and 32.1 |
| COD (mg/l) | 8.2 | Japan Industrial Standard K 0102 17 |
| SS (mg/l) | 10.9 | Environment Agency Notification Number 59(1971) Table 6 (G.F.P. Method) |
| pH (°C.) | 7.8(21) | Japan Industrial Standard K 0102 12.1 Glass Electrode Method |
| DO (mg/l) | 7.1 | Japan Industrial Standard K 0102 32.1 |
| Whole Nitrogen (mg/l) | 5.25 | Japan Industrial Standard K 0102 45.1 Method of summation |
| Whole phosphorous (mg/l) | 0.07 | Japan Industrial Standard K 0102 46.3.2 Nitric acid perchloric acid decomposition Molybdenum blue Absorptiometry |

Test 3

Another test was performed at Toque Pulp, Shimada-shi, Shizuoka Prefecture, Japan with the following results:

| Measured Item | Measured amount | Method |
| --- | --- | --- |
| Before treatment | | |
| BOD (mg/l) | 201 | Japan Industrial Standard K 0102 21 and 32.1 |
| SS (mg/l) | 468 | Environment Agency Notification Number 59(1971) Table 6 (G.F.P. Method) |
| pH (°C.) | 9.3(25) | Japan Industrial Standard K 0102 12.1 Glass electrode method |
| After treatment | | |
| BOD (mg/l) | 98.8 | Japan Industrial Standard K 0102 21 and 32.1 |
| SS (mg/l) | 43.5 | Environment Agency Notification Number 59(1971) Table 6 (G.F.P. Method) |
| pH (°C.) | 8.6(25) | Japan Industrial Standard K 0102 12.1 Glass electrode method |

The above examples demonstrate the system and method of this invention provide water purification which does not generate pollution or adversely affect the biosystem. The invention offers a flexible approach which is readily adapted to Variable conditions. The system is readily transportable; the prototype used in the test examples can be loaded on a 4t truck.

While the present invention has been described with reference to presently preferred embodiments, it is recognized that one of skill in the art would appreciate various departures and modifications that are still within the scope of the invention. The invention is to be limited only by the claims which follow.

What is claimed is:

1. A transportable system for purifying water from a dredging operation comprising:

a) a container having a first compartment in fluid communication with an inlet for receiving water to be purified opening into the first compartment and an outlet for discharging purified water;

b) a means for injecting coagulating agent into the water to be purified;

c) an agitating means disposed in the first compartment for mixing the water and the coagulating agent to form sediment;

d) discharge means connected to the first compartment for collecting and delivering the sediment to a centrifugal sediment decanter, wherein the discharge means comprise at least one weight activated valve and pump;

e) recirculation means for delivering water recovered from decanter to the first compartment; and f) a conveyor configured to remove sediment recovered from the decanter which further comprises a solidification reaction accelerating agent injector and mixer.

2. The system of claim 1 further comprising a first baffle defining a second compartment in fluid communication with the first compartment wherein the outlet for discharging purified water is located adjacent the second compartment.

3. The system of claim 2 further comprising a second baffle defining a third compartment between and in fluid communication with the first and second compartments.

4. The system of claim 3 further comprising an agitating means disposed in the third compartment.

5. The system of claim 4 further comprising a third baffle defining a fourth compartment between and in fluid communication with the second and third compartments.

6. The system of claim 5 further comprising an agitating means disposed in the third and fourth compartments.

7. The system of claim 1 wherein the agitating means comprises rotating stirring blades.

8. The system of claims 7 wherein the rotating blades are configured to counter rotate.

9. The system of claim 1 further comprising at least one additional sediment decanter.

10. The system of claim 1 further comprising an air injector configured to introduce air into the container.

11. The system of claim 1 wherein the conveying means comprises a screw conveyor.

\* \* \* \* \*